United States Patent [19]

Fogarty, Jr.

[11] Patent Number: 4,888,110
[45] Date of Patent: Dec. 19, 1989

[54] FILTERING DEVICE FOR THERMOPLASTIC MATERIAL

[75] Inventor: John E. Fogarty, Jr., Millbury, Mass.

[73] Assignee: Key Filters, Inc., Mass.

[21] Appl. No.: 25,963

[22] Filed: Mar. 16, 1987

[51] Int. Cl.$^4$ .................. B01D 33/00; B01D 35/18
[52] U.S. Cl. .................................... 210/106; 210/179;
        210/184; 210/354; 210/387; 425/197
[58] Field of Search ............... 210/106, 179, 184, 354,
        210/387, 401; 425/197

[56]  References Cited
  U.S. PATENT DOCUMENTS

| 3,471,017 | 10/1969 | Kalman | 210/179 |
| 3,645,399 | 2/1972 | Kalman | 210/184 |
| 3,856,680 | 12/1974 | Elmore | 210/184 |
| 3,971,721 | 7/1976 | Fogarty, Jr. | 210/401 |
| 4,021,346 | 5/1977 | Berthiaume | 210/179 |
| 4,070,293 | 1/1978 | Fogarty, Jr. | 210/401 |
| 4,080,297 | 3/1978 | Yoshida | 210/387 |

Primary Examiner—Richard V. Fisher
Assistant Examiner—Linda S. Evans
Attorney, Agent, or Firm—Samuels, Gauthier, Stevens & Kehoe

[57] ABSTRACT

A filtering device for filtering a thermoplastic material by passing a continuous filter across a passage through which the material is caused to flow at an elevated temperature and pressure. The filter is passed through entry and exit ports flanking the passage. Seals on the filter cooperate in sealing engagement with the walls of the entry port to prevent the flowable thermoplastic material from escaping therethrough. The exit port is larger than the entry port, and is sealed off by a solidified plug of the thermoplastic material bonded to the filter. The pressure of the thermoplastic material in the filter passage forces the plug out of the exit port into contact with an external stop, with that portion of the plug in contact with the stop being selectively heated to accommodate controlled emergence of the plug and the filter bonded thereto.

8 Claims, 1 Drawing Sheet

FILTERING DEVICE FOR THERMOPLASTIC MATERIAL

BACKGROUND OF THE INVENTION

1. Field of the Invention

This invention relates to filtering devices employing continuous filters to filter high temperature flowable thermoplastic or thermoset materials.

2. Description of the Prior Art

In the conventional filtering devices of the above-mentioned type, a housing defines a filter passage through which the thermoplastic material is caused to flow at an elevated temperature and pressure. The housing has entry and exit ports flanking the filter passage. A continuous filter is moved through the entry port, across the filter passage, and out through the exit port, with that portion of the filter extending across the filter passage being arranged to filter the thermoplastic material flowing therethrough.

Various arrangements have been proposed for moving the filter through the filter passage. In one such arrangement, as disclosed for example in U.S. Pat. No. 3,971,721, an external device is employed to mechanically grip and pull the filter through the device. Although such drives operate in a satisfactory manner, they are expensive and they occupy considerable space, thus making the filtering devices bulky and difficult to position in the confined spaces which are often found along commercial production lines.

U.S. Pat. No. 3,471,017 discloses another prior art arrangement where a solidified plug of the thermoplastic material is formed in the exit port. The plug is bonded to the filter and is forced out through the exit port by the pressure of the flowable material in the filter passage. The drawback with this type of arrangement is that once the plug is formed, the temperature at the exit port must be precisely controlled to within ±a few degrees in order to reheat the solidified material just enough to achieve carefully controlled plug movement. Insufficient heating stalls the plug in the exit port, while excessive heating can result in the plug being torn away from the filter and in extreme cases, being blown out of the exit port by the pressure of the flowable material in the filter passage. Moreover, the required temperature ranges vary depending on the material being filtered, thus making it difficult to operate this type of device on a commercial scale.

Other prior art arrangements of the type disclosed in U.S. Pat. No. 4,021,346 attempt to combine the plug concept with mechanical external drives. Here again, close control must be exercised over the temperature of the plugs, and the external drives are expensive and bulky.

SUMMARY OF THE INVENTION

A general object of the present invention is to provide an improved means of achieving controlled movement of the continuous filter through the filtering device, without the disadvantages and drawbacks noted above in connection with the prior art.

A more specific object of the present invention is to provide a filtering device wherein the continuous filter is driven by the pressure of the flowable thermoplastic material acting on a solidified plug of the material bonded to the filter at the exit port, and wherein movement of the plug and filter through the exit port is controlled by means located externally of the exit port.

In a preferred embodiment of the invention to be described hereinafter in greater detail, these as well as other objects and advantages are achieved by positioning a stop externally of the housing in the path of the plug emerging from the exit port. The portion of the plug in contact with the stop is selectively heated, thereby allowing the plug to flow or move past the stop at a controlled rate.

Preferably, the stop is heated to effect controlled movement of the plug.

The stop is preferably movable between a closed position blocking off the exit port and an open position spaced therefrom along the path of the exiting plug. The stop is closed to allow initial formation of the plug during start up, and is thereafter shifted to the open position to accommodate controlled plug movement.

Preferably, the stop is shaped in the form of a knife to subdivide the heated portion of the plug in contact therewith into two strip-like segments which move past the stop as the plug emerges from the exit port.

Additional heating means may be provided along the exit port to ease the passage of the plug there-through.

A preferred embodiment of the invention will now be described in connection with the accompanying drawings, wherein:

DESCRIPTION OF PREFERRED EMBODIMENT

Figure 1:
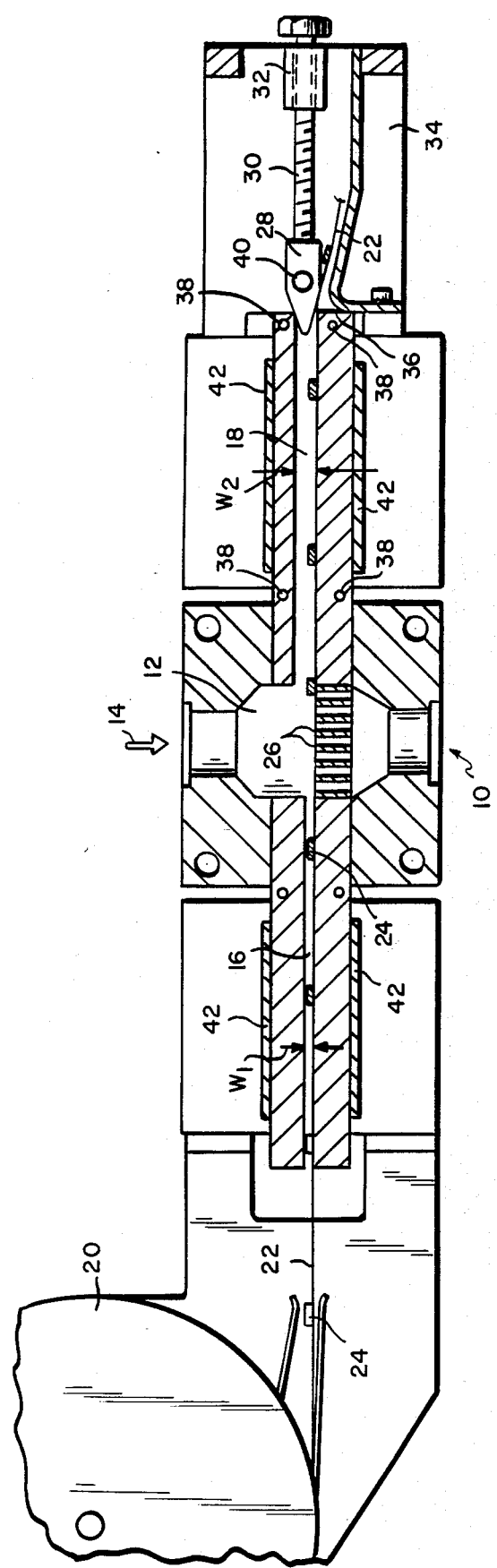
FIG. 1 is a somewhat schematic horizontal sectional view taken through a filtering device in accordance with the present invention, with the exit stop adjusted to the closed position.

Referring initially to FIG. 1, a filtering device in accordance with the present invention is shown including a housing 10 defining a filter passage 12 through which a high temperature thermoplastic material may be caused to flow under pressure in the direction indicated by arrow 14. Longitudinally extending entry and exit ports 16,18 in the housing communicate with the filter passage 12. The entry port has a width "$W_1$" and a cross sectional area which are significantly smaller than the width "$W_2$" and cross sectional area of the exit port 18.

A filter spool 20 is rotatably mounted externally of the housing 10. The spool contains a coil of a continuous filter 22 which preferably is of the type disclosed in U.S. Pat. No. 4,070,293, the disclosure of which is herein incorporated by reference in its entirety. The filter typically comprises a wire mesh with mutually spaced seal member 24 extending transversally along the length thereof.

The filter 22 is payed off the spool 20 and is passed through the entry port 16, across the filter passage 12, and out through the exit port 18. A breaker plate 26 supports that portion of the filter 22 extending across the filter passage.

Figure 2:
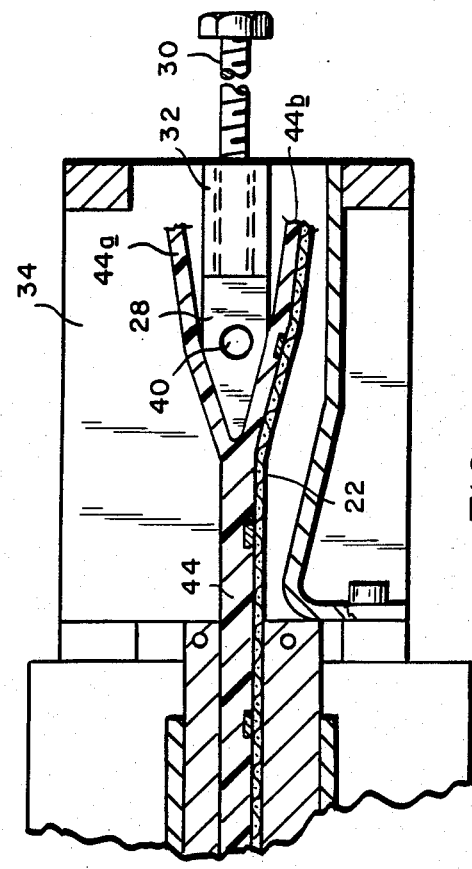
FIG. 2 is an enlarged view of the exit port, with the exit stop adjusted to the open position to accommodate emergence of the plug.

A stop 28 is located externally of the housing 10 at the exit port 18. The stop is carried on the end of a rod 30 threaded through a block 32 carried on an external bracket 34. By rotatably adjusting the rod 30, the stop can be shifted between a closed position as shown in FIG. 1, and an open position as shown in FIG. 2.

When in the closed position, the stop 28 pinches the filter against the wall of the outlet port as at 36, and completely seals off the outlet port.

A plurality of coolant passages indicated typically at 38 extend through the housing at selected locations along the exit port 18. An electrical resistance heater 40 is carried by the stop 28, and auxiliary electrical resistance heaters 42 are arranged alongside the entry and exit ports 16,18. Thermocouples (not shown) also are located alongside the entry and exit ports 16,18 as well as on the stop 28. A controlled flow of water or other appropriate coolant is circulated through the coolant passages 38 by conventional means (not shown).

During startup, the stop 28 is adjusted to the closed position shown in FIG. 1, and a thermopastic material is caused to flow at an elevated temperature and pressure through the filter passage 12 and that portion of the filter 22 extending thereacross. Typically, the thermoplastic material will comprise a polymer which is heated to a temperature of about 400° F. and forced through the filter passage 12 by an upstream extruder or melt pump and connecting pipes (not shown). During startup, the high temperature thermoplastic material will flow laterally into the entry and exit ports 16,18. The flow into the entry port will be blocked by the filter seals 24 which coact in sealing engagement with the inner wall surfaces of the entry port 16. The flow into the exit port 18 will be unopposed by the filter seals 24 due to the larger size of the exit port and the space that exits between its inner wall surfaces and the seals 24. Thus, the thermoplastic material will progress along the exit port 18 until it encounters the closed stop 28, thus completely filling the exit port.

As this is taking place, coolant is circulated through the passages 38 to cool and solidify the thermoplastic material in the exit port, thus forming a plug 44 which is intimately and securely bonded to the filter 22, with the seal members 24 being embedded in the plug, as can be best seen in FIG. 2. Thermocouples (not shown) will signify when the appropriate temperature has been achieved to form the plug. After the plug has been formed, the stop 28 is backed off to the open position shown in FIG. 2. As the stop moves to the open position, it is followed by the plug, the latter being pushed out of the exit port 18 by the pressure of the high temperature flowable material in the filter passage 12. Since the plug is intimately bonded to the filter 22, the filter is also moved with the plug, causing a fresh supply of the filter to be unwound from the spool 20 and pulled through the entry port 16 and across the filter passage 12.

After the stop 28 has reached its open position, the heater 40 is energized to heat the stop and that portion of the plug 44 in contact therewith. The contacting portion of the plug is heated sufficiently to cause it to flow past the stop 28, thereby permitting the plug to continue emerging from the outlet port 44.

Preferably, the stop 28 has a tapered nose which serves to subdivide the plug 44 into two segments or strips 44a,44b with the filter 22 remaining intimately bonded to the strip 44b. As the strips 44a,44b move past the stop 28, they are directed to a remote location where they are subdivided by knives or the like (not shown) and either discarded or reheated to recover the plug material for recycling.

The provision of a tapered somewhat-sharpended nose on the stop 28 is advantageous from another respect in that it allows the nose to become partially embedded in and interlocked with the end of the plug 44 during its initial formation. This interlocking insures that the plug does not slip past the stop until the heater 40 is energized to achieve controlled plug movement.

As the leading end of the plug 44 continues to emerge from the exit port 18, the trailing portion of the plug is continually being reformed by appropriate control of coolant flow through the passages 38. Movement of the plug can be continuous, or it can be intermittent, depending on how the heater 40 is controlled. In order to assist or facilitate movement of the plug through the exit port, the auxiliary heaters 42 can be energized to intermittently raise the temperature of the outer skin of the plug.

In light of the foregoing, it will now be appreciated by those skilled in the art that the present invention provides an improved and simplified arrangement for controlling the movement of the plug emerging from the exit port 18. Such movement is controlled initially by shifting the stop 28 from the closed to the open position, and thereafter, by selectively energizing the heater 40.

While the heater 40 has been shown mounted on and movable with the stop 28, it will be understood that other heating arrangements can be employed to heat that portion of the plug in contact with the stop. For example, the portion of the plug contacting the stop could be heated by externally applied resistance heaters, or by other means including induction heating, heated fluids, etc. Likewise, other mechanisms could be employed to shift the stop between the open and closed positions, including for example mounting the stop on the end of the piston rod of a double acting cylinder.

It is my intention to cover these and any other changes or modifications which do not depart from the spirit and scope of the invention as defined by the claims appended hereto.

I claim:

1. A filtering device for filtering a thermoplastic material which is flowable at an elevated temperature and which solidifies at a lowered temperature, said device including:

a housing defining a passage through which said material may be caused to flow under presure at said elevated temperature;

an entry port and an exit port in said housing communicating with said passage;

a continuous filter movable through said entry port, across said passage and through said exit port, with that portion of the filter in said passage being arranged to filter the material flowing therethrough;

cooling means for forming a solidified plug of said material in said exit port, said filter being bonded to said plug and said plug being dimensioned to be forced out through said exit port by the pressure of the flowable material in said passage, thereby imparting a corresponding movement to said filter with the result that said filter is pulled through said entry port and across said passage;

stop means arranged to be contacted by and to oppose the movement of said plug out through said exit port; and heating means for reheating that portion of said plug in contact with said stop means, said stop means being configured and arranged to subdivide the reheated portion of said plug into multiple continuous segments, with said filter remaining interlocked with one of said segments, the said reheating being sufficient to permit said segments to move past said stop means and to thereby permit said plug to move out through said exit port.

2. The filtering device of claim 1 wherein said heating means includes means for heating said stop means.

3. The filtering device of claim 1 further comprising adjusting means for moving said stop means between a closed position blocking said exit port and an open position spaced from said exit port along the path of travel of the plug exiting therefrom.

4. The filtering device of claim 1 wherein said stop means is located externally of said housing.

5. The filtering device of claim 1 further comprising additional heating means for reheating that portion of the plug in contact with said exit port to facilitate movement of said plug towards said stop means.

6. The filtering device of claim 1 wherein said filter is provided with mutually spaced sealing members extending transversally across the length thereof, said sealing members being dimensioned to coact in sealing engagement with the interiror of said entry port to prevent the flowable material in said passage from escaping through said entry port.

7. The filtering device of claim 6 wherein said exit port is larger cross-sectionally than said entry port, and wherein said sealing members are embedded in the plug of said material formed in said exit port.

8. A filtering device for a thermoplastic material which is flowable at an elevated temperature and which solidifies at a lowered temperature, said device including:
- a housing defining a passage through which said material may be caused to flow under pressure at said elevated temperature;
- wall means defining an entry port and an exit port in said housing communicating with said passage, said exit port being larger cross-sectionally than said entry port;
- a continuous filter movable through said entry port, across said passage and out through said exit port, with that portion of the filter in said passage being arranged to filter the material flowing therethrough, said filter having mutually spaced seal members suitably configured and dimensioned to coact in sealing engagement with the wall means defining said entry port to prevent the flowable material in said passage from escaping through said entry port, said seal members being dimensioned with respect to the wall means defining said exit port to provide a space therebetween to accommodate an exiting flow of said material;
- cooling means associated with the wall means defining said exit port for cooling and forming the exiting flow of said material into a solidified plug bonded to said filter, said plug being dimensioned to cooperate in sealing engagement with the wall means defining said exit port to prevent the escape of flowable material therethrough, said plug being adapted to be forced out through said exit port by the pressure of the flowable material in said passage, thereby imparting a corresponding movement to said filter causing said filter to be pulled through said entry port and across said passage;
- stop means arranged to be contacted by and to oppose the movement of said plug and filter out through said exit port; and
- heating means associated with said stop means for reheating that portion of said plug in contact therewith, said stop means being configured to divide the reheated portion of said plug into at least two continuous segments which are pushed past said stop means by the pressure of said flowable material in said passage, said filter remaining bonded to one of said segments.

* * * * *